(12) United States Patent
Hoffmann et al.

(10) Patent No.: US 11,874,207 B2
(45) Date of Patent: Jan. 16, 2024

(54) METHOD FOR LASER MICRODISSECTION, LASER MICRODISSECTION SYSTEM AND COMPUTER PROGRAM

(71) Applicant: LEICA MICROSYSTEMS CMS GMBH, Wetzlar (DE)

(72) Inventors: Florian Hoffmann, Giessen (DE); Falk Schlaudraff, Butzbach (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 434 days.

(21) Appl. No.: 17/424,521

(22) PCT Filed: Jan. 23, 2020

(86) PCT No.: PCT/EP2020/051553
§ 371 (c)(1),
(2) Date: Jul. 21, 2021

(87) PCT Pub. No.: WO2020/160913
PCT Pub. Date: Aug. 13, 2020

(65) Prior Publication Data
US 2022/0136936 A1 May 5, 2022

(30) Foreign Application Priority Data
Feb. 5, 2019 (DE) .................. 10 2019 102 852.3

(51) Int. Cl.
*G01N 1/28* (2006.01)
*G02B 19/00* (2006.01)

(52) U.S. Cl.
CPC ........... *G01N 1/2813* (2013.01); *G01N 1/286* (2013.01); *G02B 19/0047* (2013.01); *G01N 2001/284* (2013.01); *G01N 2001/2886* (2013.01)

(58) Field of Classification Search
CPC ... G01N 1/2813; G01N 1/286; G02B 19/0047
(Continued)

(56) References Cited

U.S. PATENT DOCUMENTS 6,100,051 A * 8/2000 Goldstein .............. G02B 21/34
435/40.5
2003/0133190 A1 7/2003 Weiss
(Continued)

FOREIGN PATENT DOCUMENTS

DE 100 18 253 C2 8/2003
DE 102014202856 A1 10/2014
(Continued)

OTHER PUBLICATIONS

Translation of DE-102015108017-A1 (Year: 2016).*
(Continued)

*Primary Examiner* — Nathaniel T Woodward
(74) *Attorney, Agent, or Firm* — Leydig, Voit & Mayer, Ltd.

(57) ABSTRACT

A method for laser microdissection includes: processing a microscopic examination object by a laser beam using tuples of coordinate values which respectively indicate positions of target points on the examination object at least in a first spatial direction and a second spatial direction orthogonal to the first spatial direction, positions of at least three reference points being ascertained beforehand in each case in the first and second spatial directions and also in a third spatial direction orthogonal to the first and second spatial directions; defining a reference plane based on the positions of the reference points; and determining, for the target points, further coordinate values indicating an expected position of the target points on the examination object in the third spatial direction in each case, as determined further coordi-
(Continued)

nate values, the determining of the further coordinate values being performed depending on the defined reference plane.

15 Claims, 3 Drawing Sheets

(58) Field of Classification Search
USPC .................................................. 73/864.41
See application file for complete search history.

(56) References Cited

U.S. PATENT DOCUMENTS

| | | | |
|---|---|---|---|
| 2004/0252291 A1 | 12/2004 | Schutze | |
| 2011/0194749 A1* | 8/2011 | Morris | G01N 1/30 |
| | | | 435/40.52 |
| 2014/0049818 A1* | 2/2014 | Schlaudraff | G02B 21/34 |
| | | | 359/397 |
| 2014/0299962 A1 | 10/2014 | Takahashi | |
| 2018/0149561 A1 | 5/2018 | Schlaudraff et al. | |

FOREIGN PATENT DOCUMENTS

| | | | |
|---|---|---|---|
| DE | 102015108017 A1 * | 11/2016 | ........... G01N 1/2813 |
| DE | 102015108017 A1 | 11/2016 | |
| DE | 102015108276 A1 | 12/2016 | |
| EP | 1 276 586 B1 | 8/2005 | |
| EP | 1985987 A2 * | 10/2008 | ............. G01N 1/286 |
| EP | 1985987 A2 | 10/2008 | |
| WO | WO 97/11156 A2 | 3/1997 | |

OTHER PUBLICATIONS

Translation of EP-1985987-A2 (Year: 2008).*
Bancroft, John D. and Marilyn Gamble (Ed.), "Laser Microdissection", Theory and Practice of Histological Techniques, Churchill Livingstone/Elsevier, Netherlands, Dec. 2008, pp. 575-576.

* cited by examiner

METHOD FOR LASER MICRODISSECTION, LASER MICRODISSECTION SYSTEM AND COMPUTER PROGRAM

CROSS-REFERENCE TO PRIOR APPLICATIONS

This application is a U.S. National Phase application under 35 U.S.C. § 371 of International Application No. PCT/EP2020/051553, filed on Jan. 23, 2020, and claims benefit to German Patent Application No. DE 10 2019 102 852.3, filed on Feb. 5, 2019. The International Application was published in German on Aug. 13, 2020 as WO 2020/160913 under PCT Article 21(2).

FIELD

The present invention relates to a method for laser microdissection, a laser microdissection system and a corresponding computer program.

BACKGROUND

Laser microdissection is a powerful and non-destructive method for obtaining single cells or cell regions from specific regions of microscopic samples, which can subsequently be subjected to a large number of examination techniques. For an overview, reference should be made to relevant textbooks, for example the chapter "Laser Microdissection" in John D. Bancroft and Marilyn Gamble (eds.), Theory and Practice of Histological Techniques, Churchill Livingstone/Elsevier, 2008, page 575.

During laser microdissection, the cell and tissue morphology and at the same time the macromolecules in the cell are maintained to the greatest possible extent. The cells obtained therefore allow examination of the respective genetic information and of proteins by means of corresponding methods. Laser microdissection can be used to process a variety of microscopic samples, for example frozen samples, tissue sections embedded in paraffin or plastic, smears of blood and other bodily fluids and cell cultures. Besides such biological samples, artificial materials or plastics, glass and also thin sections of metals or minerals or rock samples can also be processed, under certain circumstances, by means of laser microdissection.

For use in laser microdissection, tissue sections and other samples can be stained by means of knokwn staining techniques, for example using haematoxylin/eosin, or be marked in some other way or be used in an unstained state. In particular, immunohistochemical staining techniques together with fluorochromes or chromagens can be used, or fluorescence in-situ hybridization (FISH) can be carried out. The staining or marking techniques respectively used also depend in particular on the type of examinations to be carried out afterwards.

The terms "sample", "object", "examination object" and the like are used synonymously hereinafter and can denote any type of the stained or marked or unstained or unmarked samples explained above. In particular, corresponding examination objects for use in laser microdissection, in a manner that is known in principle, are fixed or immobilized on an object carrier and optionally covered by means of a membrane.

The general term "laser microdissection" is used for a large number of different method variants, which those skilled in the art usually refer to using English technical terms. Corresponding method variants are described in many instances in the technical literature and are only summarized briefly below. The present invention can be used in connection with all method variants, in principle.

In all cases, during laser microdissection, the positioning of the laser beam used for processing is performed by way of a relative movement between the laser beam and the examination object. In specific configurations, said relative movement can be achieved by way of a horizontal movement of the sample stage. In one particularly advantageous alternative configuration, described for the first time for example in DE 100 18 253 C2, the microscope stage is arranged in a stationary fashion, by contrast, during cutting or for (fine) positioning of the laser beam. In this configuration, a laser scanning device is arranged in a reflected-light device of the microscope used, said reflected-light device radiating the laser beam onto the examination object via the microscope objective, said laser scanning device here consisting of two thick transferant wedge plates, which are inclined relative to the optical axis and rotatable independently of one another about the optical axis.

The wedge plates are preferably driven via stepper motors, which cause a relative rotation of the wedge plates with respect to one another. The laser beam is guided by the wedge plates, whereby it is deflected by a deflection angle relative to the optical axis. The deflection angle can be set and varied by way of the rotation of the wedge plates about the optical axis, but the arrangement is effected in such a way that, however, the laser beam in particular always passes through the center of the back objective pupil. This is achieved in particular by way of a suitable choice of the thickness and the inclination of the wedge plates. A corresponding laser microdissection system will also be explained below with reference to appended FIG. 1.

In the configuration just explained, the laser beam can be directed at arbitrary points in the plane of the examination object. For this purpose, the maximum deflection angle is dimensioned such that the laser beam is deflected only as far as the edge of the field of view. This simultaneously applies to all objectives independently of the magnification thereof. The use of a corresponding laser scanning device in the particularly advantageous configuration just explained makes it possible to dispense with a complicated motorized sample stage. Since the sample stage is stationary during the cutting process, the user can observe and control the cutting process in the specimen.

The different method variants already discussed above differ in particular in the way in which regions to be examined are detached from the structure of the examination object and transferred into suitable collecting vessels or to suitable carriers.

In one method variant, the laser beam, in particular in the form of a cutting line, is guided around the region to be examined, this being separated as a result. In this case, the examination object is arranged in particular at the underside of an object carrier that is coated or covered by means of a membrane. The action of the laser beam causes the examination object and/or a membrane connected thereto to be severed, and the region separated in this way can fall into a collecting vessel arranged beneath the examination object owing to the effect of gravity. For processing purposes, for example, a cutting line can also be closed by means of a finely focused laser beam apart from one or more remaining webs. By means of subsequent refocusing, the laser beam can be expanded and directed at the remaining web(s). In this way, it is possible to prevent for example rotations and a stress-dictated deflection during falling.

In the case of so-called laser pressure catapulting (LPC), by contrast, the sample cut out is catapulted, in particular by a suitable laser pulse being directed in a targeted manner at an above-explained residual web of a cutting line or a cell to be separated. Various physical phenomena are held responsible for the catapulting effect. The correspondingly catapulted cells can for example be collected in a sample vessel or be attached to a membrane provided with an adhesive layer.

In the case of so-called laser capture microdissection (LCM), cells are attached to a membrane while still on the carrier by way of the action of the laser beam. By lifting or pulling off the membrane, the target regions can be torn from the structure, in the course of which they remain attached to the membrane. The target regions detached in this way can then be transferred together with the membrane into an examination vessel.

In a further variant, for example living cells in a sterile culture dish or a corresponding object carrier can be covered with a light-absorbing membrane. The laser beam can be used to cut around cells of interest below the membrane. Once the membrane is removed, the cells remain in the culture dish or on the object carrier and unwanted cells can be detached together with the film. This method variant is also referred to as cell ablation.

Laser light in the ultraviolet wavelength range is usually used for laser microdissection, the laser beam used normally being pulsed. Focusing of the laser beam results in a high energy density with at the same time narrow local delimitation of the incident laser light. High pulse frequencies can be used for example for fast cutting or attaching and also for producing fine cutting lines.

Focus control of the laser beam used is of great importance in all the cases explained. By way of example, if the width of the laser beam is set to be excessively large on account of deficient focusing, locally less energy is incident on the examination object since this energy is distributed over a larger area. Inadequate severing of the examination object or insufficiently fixed attachment to a membrane used can therefore occur, for example.

It is true that as a countermove to this the laser power can be increased or a corresponding region can be irradiated with the laser beam for longer or repeatedly. However, such measures are typically at the expense of sample quality, for example owing to thermal damage to the examination object, and possibly result in a longer experimental duration. Expanding the laser beam additionally results in a reduction of the specificity or local resolution during sample processing and may thus give rise to incorrect results.

The focusing of the laser beam is made more difficult by the fact that it is in extremely rare cases that an examination object can be aligned exactly horizontally or in an exactly reproducible position with respect to the optical axis of the laser microdissection system. Processing points or processing lines during laser microdissection are often defined in separate optical devices, for example on the basis of digital images recorded from an object carrier with the examination object arranged thereon, in particular in so-called slide scanners. A slide scanner is used to capture a multiplicity of carrier-mounted examination objects in order to be able to effect a diagnosis on the basis of the captured digital data and a corresponding marking. The use of separate optical devices has the advantage that the actual laser microdissection system can be used exclusively for obtaining material, whereas the time-consuming definition of processing points or processing lines can be performed in parallel in the separate optical device, or a plurality of such devices.

It is true that in a corresponding procedure the position of the respective target point in a direction parallel to the optical axis of the laser microdissection system, i.e. in the so-called Z-direction, is known in principle on account of the known mechanical and optical conditions. However, said position changes slightly as a result of unavoidable slight tilting of the object carrier during introduction into the laser microdissection system, such that a possibly predefined focal distance deviates from the real focal distance and thus, without corresponding refocusing, the width of the acting laser beam can be undesirably increased with the disadvantages explained above. Although it is possible to perform refocusing or autofocusing, this, however, inevitably results in significant delays during processing and possibly additional outlay.

SUMMARY

In an embodiment, the present invention provides a method for laser microdissection, comprising: processing a microscopic examination object by a laser beam using tuples of coordinate values which respectively indicate positions of target points on the examination object at least in a first spatial direction and a second spatial direction orthogonal to the first spatial direction, positions of at least three reference points being ascertained beforehand in each case in the first and second spatial directions and also in a third spatial direction orthogonal to the first and second spatial directions; defining a reference plane based on the positions of the reference points; determining, for the target points, further coordinate values indicating an expected position of the target points on the examination object in the third spatial direction in each case, as determined further coordinate values, the determining of the further coordinate values being performed depending on the defined reference plane; and setting a focal position of the laser beam for processing the examination object depending on the determined further coordinate values.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention improves possibilities for focusing the laser beam in a laser microdissection system even in the cases explained above.

In an embodiment, the present invention provides a method for laser microdissection, a corresponding laser microdissection system and a corresponding computer program having the features described herein.

In the method for laser microdissection proposed according to the invention, as is also the case in principle in methods in accordance with the prior art, a microscopic examination object is processed by means of a laser beam using tuples of coordinate values which respectively indicate positions of target points on the examination object at least in a first spatial direction and a second spatial direction orthogonal to the first spatial direction. The tuples of coordinate values can be present in particular as coordinate pairs, i.e. pairs of ordinate and abscissa values in a cartesian coordinate system. However, corresponding tuples of coordinate values can also be present as coordinate triples, in which an applicate value is in each case assigned to the ordinate and abscissa values in the coordinate system.

In the linguistic usage employed here, the terms abscissa value (x-value) and ordinate value (y-value) or corresponding directions are intended in each case to denote coordinate values or directions which are defined by way of corresponding axes which lie in one plane and are perpendicular to one another. In this case, these axes (abscissa and ordinate, x-axis and y-axis) are perpendicular to an objective axis of a laser microdissection system or of the microscope thereof which is used in the context of the present invention. The abscissa and the ordinate furthermore correspond to the horizontal directions of movement in which a microscope stage can be moved in a motorized manner or manually in order to bring different regions of a sample to be examined into the field of view of the microscope and thereby to be able to observe them or process them by means of a laser beam. By means of an adjustment in abscissa and ordinate directions, any desired sample region can be brought into the field of view, provided that this is permitted by a scope of adjustment.

As mentioned, in laser microdissection, in order to achieve a relative movement between the laser beam used for processing the examination object and the examination object, either the sample stage is moved in a corresponding plane, or the laser beam is deflected using a laser scanning device. The present invention is suitable for both cases.

By contrast, the term applicate value (z-value) or a corresponding direction is intended to denote a coordinate value or a direction which is defined by way of an axis (applicate, z-axis) which is perpendicular to the abscissa and to the ordinate. This axis furthermore corresponds to the vertical direction of movement in which a microscope stage can be moved in a motorized manner or manually relative to a microscope along the direction of the objective axis, in particular in order to perform focusing of the sample to be examined or of components of said sample, in particular at different depths, in the field of view of the microscope and thereby to be able to observe or process same by means of the laser beam.

In the context of the present invention, the tuples of coordinate values can in particular, as also explained in further detail below, be combined to form tuple groups that define a cutting line. However, it is also possible to use individual tuples of coordinate values, for example in order to detach single cells or specific object regions from the sample by means of a single laser beam pulse ("shot") and to transfer ("shoot out") same into a corresponding receiving vessel, for example, or in order to attach a corresponding cell or a corresponding sample region locally to a transfer membrane explained above. For this purpose, i.e. for locally processing a sample region, corresponding tuples of coordinate values can however also be combined to form tuple groups which however do not form a cutting line but rather a cluster of target points, for example in order to destroy specific object regions in a targeted manner or to attach them to a membrane more fixedly by way of an enlarged adhesion area.

In the context of the present invention, however, provision can also be made for using a tuple of coordinate values or a group of corresponding tuples in the sense just explained, for example, on the basis of which only a cutting line, a cutting line offset or the like is determined. In this case, therefore, the tuples of coordinate values serve only as predefined or starting points, on the basis of which the actual processing points or processing lines are then defined. By way of example, in a corresponding method, by means of a corresponding tuple, the center point of a cell to be processed or of a sample region to be processed or some other anchor point can be marked, on the basis of which, with knowledge or approximately knowledge of the size of the cell or of the region to be processed, a processing line or cutting line can then be placed, for example circularly or in some other suitable shape, around the center point or anchor point.

The tuples of coordinate values used in the context of the present invention can also be assigned, in particular, besides the abscissa and ordinate values, predefined values in the direction of the applicates, which indicate a target position in this direction. Further details are explained below. However, the tuples of coordinate values used in the context of the present invention can also be assigned other parameter values used for processing the sample. By way of example, the individual target points on a cutting line can be assigned different predefined values for the laser power used. This can therefore be done for example in order to ensure complete severing of the examination object in more robust regions and to avoid damage to the examination object in more sensitive regions. In cases where a sample region is separated from a corresponding examination object by means of a cutting line in which one or more webs initially remain, a tuple of coordinate values, for the purpose of severing a corresponding web, for example, can also be assigned a predefined value on the basis of which the laser beam can be expanded by targeted defocusing and the web can be severed in this way.

As explained in the introduction, particularly if separate optical devices are used for predefining processing points or processing lines, it is possible for inaccuracies to occur in the positioning of the examination object or of the object carrier carrying the examination object in a direction parallel to the optical axis of the microscope objective. As a result, as likewise mentioned, an exact focus predefinition is typically not possible in the method in accordance with the prior art.

The present invention now overcomes this disadvantage of the methods known from the prior art by virtue of the fact that positions of at least three reference points are ascertained beforehand in each case in the first and second spatial directions and also in a third spatial direction orthogonal to the first and second spatial directions. In this case, the first and second spatial directions correspond in particular to the abscissa and ordinate directions. By contrast, the third spatial direction is the applicate direction already described above.

The present invention furthermore provides for a reference plane to be defined on the basis of the positions of the reference points. As indicated, in the context of the present invention, more than three reference points can also be used instead of exactly three reference points. In this case, the reference points which permit a corresponding plane to be defined plausibly or in a manner affected by the smallest possible deviations can be determined by means of suitable matching methods. Reference points affected by errors on account of measurement inaccuracies ("outliers"), for example, can be excluded in each case in the definition of the plane.

In the context of the present invention, the definition is effected by way of at least three reference points since an unambiguous plane definition is made possible by three reference points. As explained, in the corresponding method in accordance with the prior art, in particular a slight inclination of an object carrier carrying the examination object may also be present, and so a pure distance definition, for example by way of a measurement as far as an arbitrary point on the examination object, for an unambiguous or precise definition of focal points at different positions of the examination object is not possible. Through the use of a corresponding plane that is also possibly inclined relative to the optical axis, in the context of the present invention, by contrast, a focal point can be at least predefined for each region of the examination object, wherein a possible inclination of the examination object or of the carrier thereof can be compensated for.

On the basis of a correspondingly defined reference plane, in the context of the present invention, coordinate values for the respective target points on the examination object can be ascertained. This is done in particular by determining for the target points in each case further coordinate values indicating an expected position of the target points on the examination object in the third spatial direction, wherein the determination of the further coordinate values is performed depending on the defined reference plane. Details concerning a corresponding definition are explained below.

The present invention makes use of the fact that the examination object is typically arranged parallel on a corresponding object carrier and an inclination defined in relation to the object carrier, such as is ascertained with the aid of the reference points on the basis of the plane ascertained previously, should therefore be observed for the examination object as well.

In the context of the present invention, finally, a focal position of the laser beam for processing the examination object is set depending on the further coordinates determined. It is thereby possible to implement a focal position of the laser beam in each case on the basis of the respectively ascertained coordinate values in the third spatial direction, i.e. the applicate direction.

As already mentioned, the present invention makes use of the fact that the reference plane corresponds at least partly to a plane in which a surface of the examination object is arranged. The setting of the focal position of the laser beam for processing the examination object depending on the further coordinate values determined, such as is performed according to the invention, here does not have to comprise setting a focal point or the focal position of the laser beam exactly to the reference plane ascertained on the basis of the reference points. In particular, in this context, a possibly present (and known) offset of the surface of the examination object relative to the reference plane ascertained previously can also be taken into account, for example if the reference points are ascertained on the object carrier itself and if the sample has a known thickness and the surface of the sample is therefore at a certain distance from said reference plane. In this case, the setting of the focal position also does not have to comprise precisely focusing the laser beam onto the surface of the examination object. Rather, if necessary, it is also possible to set a focal position slightly above or below (but in a reproducible position on account of the measures proposed according to the invention).

The use of the reference plane makes it possible to ascertain the coordinate values in the third spatial direction in a particularly simple manner, specifically in particular by performing a projection of the coordinate values defined previously in the first and second spatial directions onto a corresponding plane. In other words, in the context of the present invention, the determination of the further coordinates depending on the defined reference plane can comprise in particular in each case determining a position of the defined reference plane in the third spatial direction at a position which is indicated by the associated tuple of coordinate values in the first and second spatial directions for the respective target points. In other words, a corresponding tuple of coordinate values respectively comprises the x- and y-directions, and the z-direction is defined by a corresponding geometrical projection onto the reference plane. On the basis of the procedure explained, the horizontal position predefined by the coordinate values in the first and second spatial directions is not influenced.

In the context of the present invention, in particular an autofocus system can be used, which firstly is preset to a preset value and which subsequently carries out an autofocus routine on the basis of features of the examination object. The preset value can be predefined in particular depending on a position of the reference plane in the third spatial direction. This means, in other words, that, in the context of the present invention, a corresponding autofocus system can be preset on the basis of the values as described above, and therefore only has to compensate for any residual error possibly remaining. This residual error remaining, which defines the scope in which the autofocus system has to be adjusted, is in any case significantly below the adjustment range in which a corresponding autofocus system has to be adjusted if a corresponding predefinition is not effected. A corresponding autofocus system can therefore focus the real object surface very much more rapidly than would be the case without the use of a corresponding predefined value. As a result, the method is considerably accelerated and possible errors that may influence the autofocus system can be eliminated.

In still other words, in the context of the present invention, in connection with such an autofocus system, firstly a position of the respective target points in the third spatial direction is estimated on the basis of the reference plane and a corresponding estimated value is used for driving an autofocus system. The autofocus system then focusses on the sample surface actually present at the respective target point, which sample surface can deviate from the target plane or reference plane or a value determined on the basis of the reference plane on account of slight unevennesses of the sample.

In the context of the present invention, reference points which lie within or outside a region in which the examination object is situated can be used in principle. Advantageously, corresponding reference points, if they lie outside the region in which the examination object is situated, are situated on an object carrier, however, which is used as referential plane in this case. By way of example, distinctive sample points and/or markings introduced into the sample by means of suitable methods can be used as reference points within the region of the examination object. Corresponding reference points can be recognized and used for defining the reference plane in the manner explained above.

Markings on an object carrier on which the examination object is situated can also be used as reference points. In this case, an object carrier can be provided with suitable referential points which are recognizable by means of a corresponding automated recognition method and which in particular can also have a defined position on the object carrier and can be found rapidly as a result. Corresponding referential points can be visually recognizable, such that a user can carry out a check of a correct recognition of these reference points by the laser microdissection system. However, reference points can also be used for example in the form of fluorescent markings that are invisible to the observer.

In the context of the present invention, the tuples of coordinate values that have been explained above can be in particular coordinate pairs which respectively indicate positions of the target points on the examination object in the first and second spatial directions. The further coordinate values in the third spatial direction that are determined in the context of the method according to the invention can then respectively be assigned to these coordinate values. This method variant therefore initially works without a predefinition of values in the third spatial direction; instead these values are defined completely by way of the method according to the invention.

As an alternative thereto, it is also possible to use tuples (triples) of coordinate values which in each case also indicate a predefined position of the target points on the examination object in the third spatial direction. In this case, said predefined position of the target points can take account of a predefined value which would be present if for example a corresponding object carrier were arranged ideally completely planar in or parallel to a focal plane. In the context of the present invention, the predefined coordinate values are then corrected in each case on the basis of the further coordinate values determined. The present invention thus ascertains an "offset" for corresponding predefined values which is applied to the coordinate values already present in the applicate direction.

In principle, in the context of the present invention, the coordinate values can define cartesian coordinates or polar coordinates in a referential coordinate system. In particular, the target points can be part of a processing line, along which the examination object is processed by means of the laser beam. In particular, in this case, the processing of the examination object by means of the laser beam can comprise cutting the examination object. As already explained above, however, the present invention can in principle also be used in non-cutting laser microdissection methods, for example in laser capture microdissection explained in the introduction.

The method according to the invention proves to be advantageous particularly if the tuples of coordinates are ascertained in an examination device, for example a slide scanner explained in the introduction, and are imported into a laser microdissection system used for processing the examination object by means of the laser beam. In this case, the examination object that was previously captured in imaging fashion and examined in the examination device is also introduced into the laser microdissection system used. For further advantages of a corresponding method variant, reference should expressly be made to the explanations above.

The present invention furthermore relates to a laser microdissection system which processes a microscopic examination object by means of a laser beam using tuples of coordinate values which respectively indicate positions of target points on the examination object at least in a first spatial direction and a second spatial direction orthogonal to the first spatial direction. According to the invention, the laser microdissection system is configured to ascertain beforehand positions of at least three reference points at least in each case in the first and second spatial directions and also in a third spatial direction orthogonal to the first and second spatial directions, to define a reference plane on the basis of the positions of the reference points, to determine in each case for the target points further coordinate values indicating an expected position of the target points on the examination object in the third spatial direction, to perform the determination of the further coordinate values depending on the reference plane defined by the position of the reference point(s), and to set a focal position of the laser beam for processing the examination object depending on the further coordinate values determined.

A corresponding laser microdissection system is configured in particular for carrying out a method such as has been explained in various configurations above, and comprises correspondingly configured means for this purpose. For configuration of a corresponding laser microdissection system, reference should expressly be made to the patent claims in this regard. The explanations given above with regard to the method according to the invention and its variants are also applicable to corresponding configurations of a laser microdissection system proposed according to the invention, and will therefore not be explained again at this juncture for reasons of clarity.

The present invention furthermore relates to a computer program comprising program code for carrying out a method such as has been explained above in configurations when the computer program is executed on a processor.

In the linguistic usage employed here, the term "and/or" encompasses all combinations of one or more of the associated elements mentioned and can be abbreviated to "/".

Although some aspects have been described in the context of a device, it is clear that these aspects also constitute a description of the corresponding method, where a block or a device corresponds to a method step or a function of a method step. Analogously to this, aspects described in the context of a method step also constitute a description of a corresponding block or element or a property of a corresponding device. Some or all method steps can be carried out by (or using) a hardware device, which may be for example a processor, a microprocessor, a programmable computer or an electronic circuit. In some exemplary embodiments, one or more of the most important method steps can be carried out by such a device.

Depending on specific implementation requirements, exemplary embodiments of the invention can be implemented using hardware or software. The implementation can be effected with a nonvolatile storage medium such as a digital storage medium, such as, for example, a floppy disk, a DVD, a Blu-ray, a CD, a ROM, a PROM and an EPROM, an EEPROM or a FLASH memory, on which are stored electronically readable control signals which interact (or can interact) with a programmable computer system such that the respective method is carried out. Therefore, the digital storage medium can be computer-readable.

Some exemplary embodiments according to the invention comprise a data carrier with electronically readable control signals which can interact with a programmable computer system, such that one of the methods described herein is carried out.

In general, exemplary embodiments of the present invention can be implemented as a computer program product with a program code, wherein the program code is effective for carrying out one of the methods when the computer program product runs on a computer. The program code can be stored on a machine-readable carrier, for example.

Further exemplary embodiments comprise the computer program for carrying out one of the methods described herein, which is stored on a machine-readable carrier.

In other words, one exemplary embodiment of the present invention is therefore a computer program with a program code for carrying out one of the methods described herein when the computer program runs on a computer.

A further exemplary embodiment of the present invention is therefore a storage medium (or a data carrier or a computer-readable medium) comprising a computer program stored thereon for carrying out one of the methods described herein when it is executed by a processor. The data carrier, the digital storage medium or the recorded medium are generally tangible and/or not transitionless. A further exemplary embodiment of the present invention is a device, as described herein, which comprises a processor and the storage medium.

A further exemplary embodiment of the invention is therefore a data stream or a signal sequence that constitutes the computer program for carrying out one of the methods described herein. The data stream or the signal sequence can be configured for example so as to be transmitted via a data communication connection, for example via the internet.

A further exemplary embodiment comprises a processing means, for example a computer or a programmable logic device, which is configured or adapted to carry out one of the methods described herein.

A further exemplary embodiment comprises a computer on which the computer program for carrying out one of the methods described herein is installed.

A further exemplary embodiment according to the invention comprises a device or a system configured to transmit (for example electronically or optically) a computer program for carrying out one of the methods described herein to a receiver. The receiver can be for example a computer, a mobile device, a storage device or the like. The device or the system can comprise for example a file server for transmitting the computer program to the receiver.

In some exemplary embodiments, a programmable logic device (e.g. a field programmable gate array, FPGA) can be used to implement some or all functionalities of the methods described herein. In some exemplary embodiments, a field programmable gate array can cooperate with a microprocessor in order to carry out one of the methods described herein. In general, the methods are preferably carried out by any hardware device.

The invention is explained in greater detail below with reference to the accompanying drawings, which illustrate configurations of the present invention.

Figure 1:
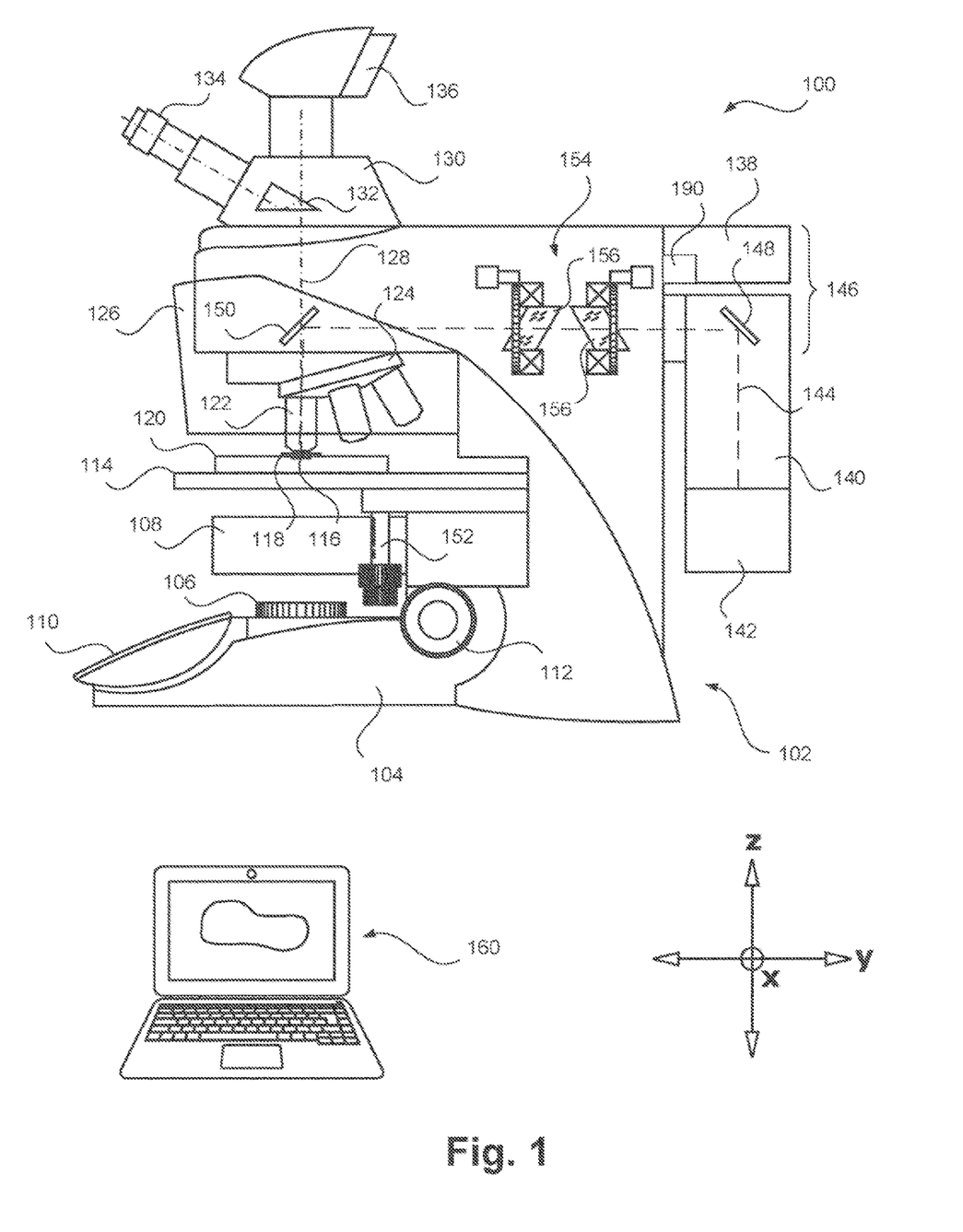
FIG. 1 illustrates a laser microdissection system in a simplified schematic representation.

In FIG. 1, a laser microdissection system in accordance with one embodiment of the present invention or a laser microdissection system which can be used for carrying out a method in accordance with one embodiment of the present invention is represented schematically and designated in its entirety by 100. The laser microdissection system 100 substantially corresponds to that disclosed in EP 1 276 586 B1, to which reference is expressly made here.

A cartesian coordinate system taken as a basis for illustrating axes or directions x, y and z mentioned below is represented at the bottom right in FIG. 1. In this coordinate system, the x-axis runs perpendicular to the plane of the drawing and the y-axis and the z-axis lie in the plane of the drawing. The x-axis, the y-axis and the z-axis are in each case perpendicular or orthogonal to one another.

The laser microdissection system 100 comprise a microscope 102. In the example represented, an illumination unit 106, only partly illustrated here, is provided in a microscope base 104 of the microscope 102. The illumination unit 106 can comprise for example a light source (not represented) for providing illumination light and also means for influencing the illumination light, for example filters and/or stops. In the example represented, a condenser unit 108 illustrated in a greatly simplified manner is provided for transmitted-light illumination and for setting suitable contrast and/or observation methods.

By way of example, an operator interface 110, which can be embodied as a touchscreen, for example, can also be arranged on the microscope base 104, via which interface a user can input and/or read out viewing and/or processing parameters, for example. The microscope 102 comprises a drive knob 112. The latter is used for operating a coarse drive and a fine drive for setting a height of a microscope stage 114.

An object 116 situated on an object carrier 118, which is in turn accommodated in a holder 120, for example a section applied on the object carrier, can thereby be introduced into an object plane of an objective 122. The objective 122 is secured alongside further objectives, not separately designated, in an objective turret 124. An in particular transparent protective hood 126 can be provided for protection against laser radiation.

Observation light radiated from the object 116 passes along an observation beam path 128. In a tube unit 130 with suitable output coupling devices 132, a preferably variable portion of the observation light, for example around 60°, can be coupled out and presented to a user by means of an eyepiece pair 134. A further portion of the observation light can be coupled into a digital image capturing unit 136 and be captured in imaging fashion. An image evaluation unit 138 can be assigned to the image capturing unit 136 in situ, in a control unit 136 or in a control computer (see below), or in some other spatial arrangement.

The laser microdissection system 100 comprises a laser unit 140 with a laser light source 142. In a reflected-light unit, indicated here in its entirety by 146, a laser beam 144 provided by the laser light source 142, which can be a UV laser light source, for example, is deflected at a first deflection mirror 148 and a second deflection mirror 150 and is focused on the object 116 by the objective 122.

In the case of the laser microdissection system 100 illustrated here, the location at which the laser beam 144 impinges on the object 116 can be set in various ways, in principle. Firstly, a manual adjusting device 152 can be provided, by means of which the microscope stage 114 embodied as an x-y stage can be adjusted in the x- and y-directions (that is to say here perpendicular and respectively parallel to the plane of the drawing), can be adjusted. Besides the adjusting device 152, electromechanical actuating means can also be provided, which for example can be driven by the control unit 138 or the position of which can be detected by the control unit 138.

The control unit 138 can also control any further motorized functions of the laser microdissection system 100 and provide in particular an interface to an external control computer 160, which can be linked via corresponding wireless or wired connections.

In particular, a laser deflecting device 154 can be provided for the laser microdissection. By means of the laser deflecting device 154, the laser beam 144 can be deflected relative to an optical axis running between the first deflection mirror 148 and the second deflection mirror 150. The laser beam can therefore impinge on the second deflection mirror 150 at different positions, which deflection mirror can be embodied as a dichromatic splitter, for example. In this case, the arrangement is in particular such that the laser beam 144 passes through the back objective pupil. By way of corresponding deflection, the laser beam 144 is focused on the object 116 at different positions. Deflection by means of a laser deflecting device 154 of the type shown here is shown in detail in EP 1 276 586 B1, for example. It should be emphasized that various possibilities for deflecting a laser beam or for positioning the object 116 relative to the laser beam 144 can be used here. The invention is not restricted to the example represented.

In the example represented, the laser deflecting device 154 comprises two solid vitreous wedge plates 156, which are inclined relative to the optical axis and are rotatable about the latter independently of one another. For this purpose, the wedge plates 156 are mounted by means of ball bearings, not designated separately. Each of the wedge plates is connected to a toothed wheel, likewise not designated separately. The toothed wheel can be rotated in each case by means of an actuator, to which a corresponding drive signal can be applied. The actuators can have position sensors and a position detected by the latter can be communicated to the control unit 138.

The microscopic image captured via the observation beam path 128 and the laser beam 144 are focused, firstly, by raising or lowering the microscope stage 114, the focal positions of the microscope objective 122 and of the laser beam 144 being coordinated. In this case, an image evaluation of the microscopic image captured via the observation beam path 128 can be performed for example in the control unit and/or in the control computer 152. By way of motorized driving of the microscope stage 114, an autofocus system is thereby implemented, which is illustrated separately again by 190.

Figure 2:
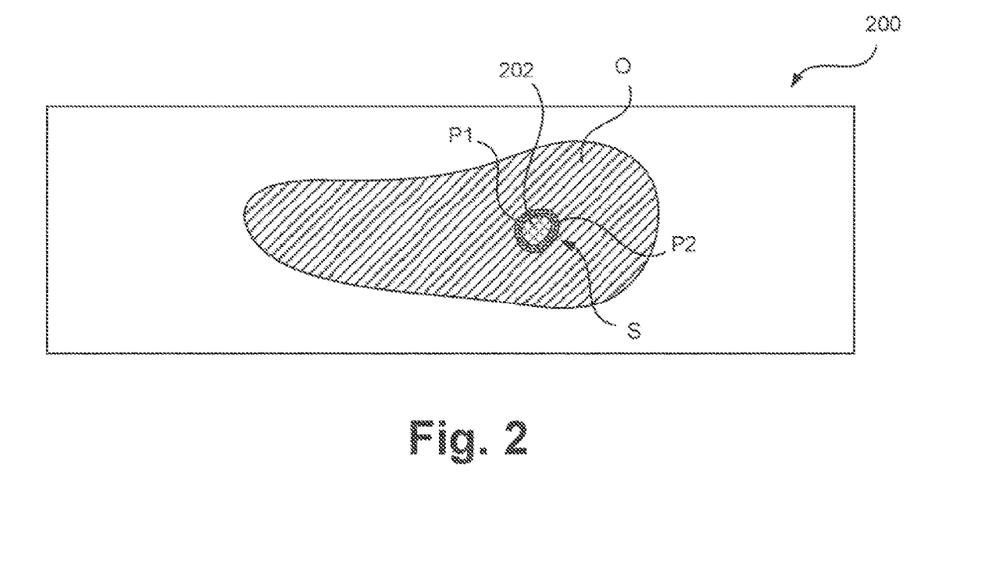
FIG. 2 illustrates the definition of a cutting line for a laser microdissection system.

FIG. 2 schematically illustrates a definition of cutting lines for a laser microdissection system, for example the laser microdissection system in accordance with FIG. 1. In this case, an object carrier 200 is represented in its entirety, on which an examination object O is arranged. The examination object O can be embodied in any desired way, in principle. The examination object O can also be arranged on or covered by a film arranged on the object carrier 200, or a corresponding membrane.

The examination object O has a cell of interest or a corresponding cell region, which is illustrated here in its entirety by 202. The cell or cell region 202 is intended to be taken to an examination by means of laser microdissection. For this purpose, in the example represented, a cutting line is intended to be guided around the cell or region 202. It should be emphasized once again, however, that the present invention is also suitable for non-cutting laser microdissection methods.

The cutting line is designated here in its entirety by S. It consists of a series of target points, illustrated in a greatly enlarged manner here, of which target points only two arbitrary target points P1, P2 are specifically designated in FIG. 2 and in subsequent FIG. 3. The target points are represented in a greatly enlarged manner. The cutting line S arises by stringing together corresponding target points P1, P2.

Further variants, for example such variants in which a web remains which is subsequently severed by a targeted laser pulse, can likewise be provided in the context of the present invention, but will not be considered here for the sake of clarity.

By way of a relative movement of the laser beam of the laser microdissection system, for example the laser microdissection system 100 in accordance with FIG. 1, the target points P1, P2 can in each case be set and one or more laser pulses can be applied. The laser microdissection system moves progressively to the target points P1, P2 and therefore cuts out the region 202 along the cutting line S in this way.

Figure 3:
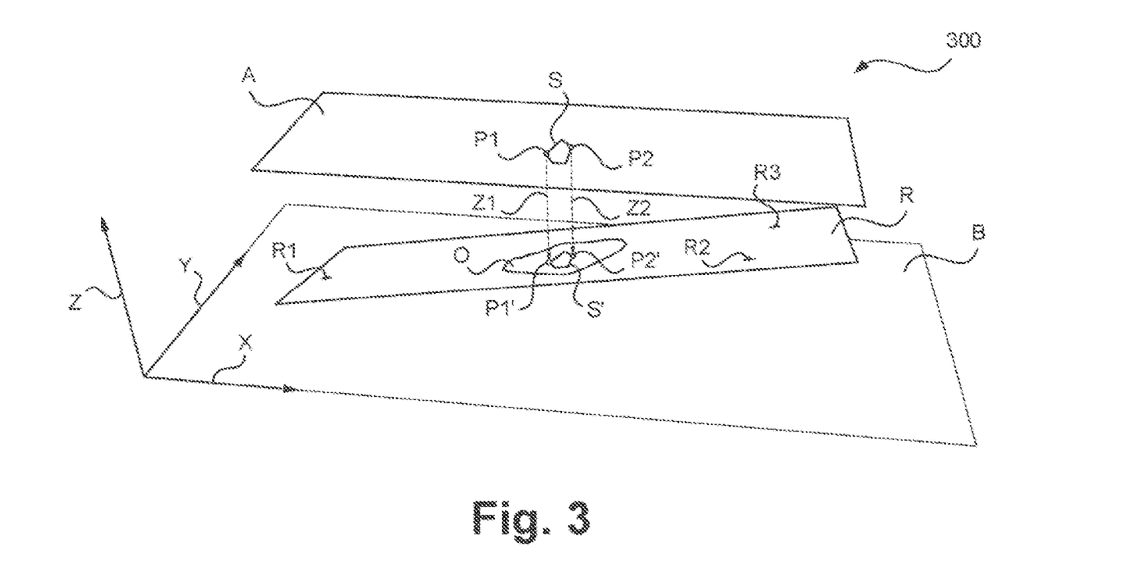
FIG. 3 illustrates a method in accordance with one configuration of the present invention on the basis of a coordinate system.

In FIG. 3, a method in accordance with one configuration of the present invention is illustrated schematically on the basis of a coordinate system with planes arranged therein and is designated in its entirety by 300. In this case, the coordinate system having the coordinate axes X, Y and Z can correspond in particular to the coordinate system having the coordinate axes x, y and z which is illustrated in FIG. 1. While in FIG. 1 here the coordinate axes y and z lie in the plane of the drawing and the coordinate axis x is perpendicular thereto, all the coordinate axes are represented perspectively in space in accordance with FIG. 3.

The coordinate axes X and Y span a referential plane B or a corresponding base plane which corresponds to a plane that is perpendicular to an optical axis of a microscope objective, for example the microscope objective 122 of the laser microdissection system 100 in accordance with FIG. 1. An object carrier, for example the object carrier 200 in accordance with FIG. 2, would ideally be arranged in or parallel to said base plane. This does not occur in practice, however, on account of an unavoidable inclination of the object carrier, for example the object carrier 200.

Illustrated parallel to the base plane B is a plane A, which can correspond in particular to a working plane in which, for example in a slide scanner, a cutting line S is predefined. The cutting line with the target points P1, P2 is represented in a simplified manner again here. As already explained, a corresponding cutting line S typically arises by stringing together a large number of target points P1, P2. The working plane A can also correspond to the referential plane. Given an ideally parallel arrangement of the object carrier with the examination object O, a surface of the examination object O would lie in the working plane or exactly parallel thereto. The working plane, as mentioned, can also be arranged in the base plane, or lie in the same plane.

In the context of the present invention, provision is then made for ascertaining a reference plane R. Said reference plane R is intended to depict the oblique position of the examination object O, or of a corresponding carrier, that is present in reality. The reference plane R can thus in particular also correspond to a plane in which lies the examination object O or an object carrier carrying the examination object, such as the object carrier 200 in accordance with FIG. 2, for example. The reference plane R is illustrated with exaggerated inclination here. Deviations that are significantly smaller, but adversely influence the focal position, typically arise in practice.

In the context of the present invention, provision is then made for defining a corresponding reference plane R by means of at least three reference points R1, R2 and R3. As already discussed above, here in the context of the present invention and in accordance with the configuration illustrated here, a position of at least three reference points is ascertained beforehand in each case in the first and second spatial directions X, Y and also in a third spatial direction Z orthogonal to the first and second spatial directions X, Y. As already explained, the reference points R1, R2 and R3 can also be sample points, which are then arranged on the examination object O, or markings applied in a targeted manner on a corresponding object carrier, for example the object carrier 200 in accordance with FIG. 2. The real positions of the positions defined by the predefined target points P1, P2 on the examination object O are designated here by P1' and P2'. Accordingly, a real cutting line defined thereby on the examination object O is designated by S'.

In the configuration of the present invention represented here, the further coordinate values, designated here by Z1 and Z2, are then determined depending on the defined reference plane R by determining a position of the defined reference plane in the third spatial direction Z at a position indicated by the respective target points P1, P2 by an associated tuple of coordinate values in the first and second spatial directions X, Y. As illustrated in the form of dashed arrows, the target points P1, P2 are thus projected onto the reference plane R.

Figure 4:
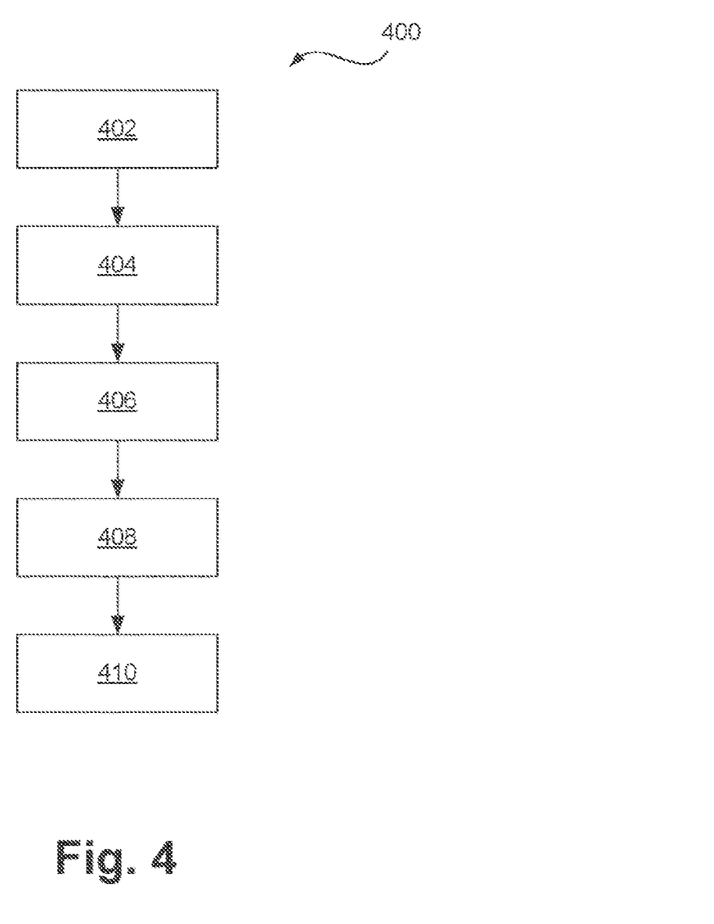
FIG. 4 illustrates a method in accordance with one embodiment of the invention in the form of a schematic flow chart.

In FIG. 3, a method in accordance with one configuration of the present invention is illustrated again in the form of a greatly simplified, schematic flow chart. The method is designated in its entirety by 400.

A step 402 here involves defining target points on an examination object, at least in a first spatial direction and in a spatial direction orthogonal to the first spatial direction. Step 402 can be carried out in particular on the basis of image data obtained for example in a slide scanner provided separately to a laser microdissection system.

In a step 404, corresponding data can be transferred into a laser microdissection system. Accordingly, the examination object or the object carrier is also brought into the laser microdissection system.

A step 406 then involves ascertaining positions of at least three reference points in the first and second spatial directions and also in a third spatial direction orthogonal to the first and second spatial directions. This can be done, as mentioned, on the basis of predefined reference points or reference points provided on an object carrier or on the basis of a sample or an examination object O.

A step 408 then involves determining for the target points in each case further coordinate values indicating an expected position of the target points on the examination object in the third spatial direction. In this case, the further coordinate values are determined depending on the defined reference plane.

In a subsequent step 410, a focal position of the laser beam for the processing and examination object is then set depending on the further coordinate values determined, and the sample is processed accordingly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Laser microdissection system
102 Microscope
104 Microscope base
106 Illumination unit
108 Condenser unit
110 Operator interface
112 Drive knob
114 Microscope stage
116 Examination object
118 Object carrier
120 Holder
122 Objective
124 Objective turret
126 Protective hood
128 Observation beam path
130 Tube unit
132 Output coupling device
134 Eyepiece pair
136 Image capturing unit
138 Image evaluation unit
140 Laser unit
142 Laser light source
144 Laser beam
146 Reflected-light unit
148 Deflection mirror
150 Deflection mirror
152 Adjusting device
160 Control computer
154 Laser deflecting device
156 Wedge plates
190 Autofocus system
x coordinate axis, spatial direction
y coordinate axis, spatial direction
z coordinate axis, spatial direction
200 Object carrier
O Examination object
202 Region of interest
S Cutting line
P1 Target point
P2 Target point
B Referential plane
A Working plane
R Reference plane
R1 Reference point
R2 Reference point
R3 Reference point
P1' Real position of target point
P2' Real position of target point
S' Real position of the cutting line
Z1 Further coordinate value
Z2 Further coordinate value
X Coordinate axis, spatial direction
Y Coordinate axis, spatial direction
Z Coordinate axis, spatial direction
400 Method
402 Defining target points 404 Transferring data into laser microdissection system
406 Ascertaining reference point positions
408 Determining further coordinate values
410 Setting focal position

The invention claimed is:

1. A method for laser microdissection, comprising:
processing a microscopic examination object by a laser beam using tuples of coordinate values which respectively indicate positions of target points on the examination object at least in a first spatial direction and a second spatial direction orthogonal to the first spatial direction, positions of at least three reference points being ascertained beforehand in each case in the first and second spatial directions and also in a third spatial direction orthogonal to the first and second spatial directions
defining a reference plane based on the positions of the reference points;
determining, for the target points, further coordinate values indicating an expected position of the target points on the examination object in the third spatial direction in each case, as determined further coordinate values, the determining of the further coordinate values being performed depending on the defined reference plane; and
setting a focal position of the laser beam for processing the examination object depending on the determined further coordinate values.

2. The method of claim 1, wherein the reference plane corresponds at least partly to a plane in which a surface of the examination object is arranged.

3. The method of claim 1, wherein the determining of the further coordinate values depending on the defined reference plane comprises in each case determining a position of the defined reference plane in the third spatial direction at a position which is indicated by an associated tuple of coordinate values in the first and second spatial directions for the respective target points.

4. The method of claim 1, wherein an autofocus system is used, which autofocus system first is preset to a preset value and which subsequently carries out an autofocus routine based on features of the examination object, and
wherein the preset value is predefined depending on a position of the reference plane in the third spatial direction.

5. The method of claim 1, wherein at least one of the reference points lies within or outside a region in which the examination object is situated.

6. The method of claim 5, wherein the reference points correspond to markings on an object carrier on which the examination object is situated, or correspond to object features.

7. The method of claim 1, wherein the tuples of coordinate values are coordinate pairs which respectively indicate positions of the target points on the examination object in the first and second spatial directions, and
wherein the determined further coordinate values are respectively assigned to the coordinate pairs.

8. The method of claim 1, wherein the tuples of coordinate values comprise predefined coordinate values which respectively indicate a predefined position of the target points on the examination object in the third spatial direction, and
wherein the predefined coordinate values are corrected in each case based on the determined further coordinate values.

9. The method of claim 1, wherein the coordinate values define Cartesian coordinates or polar coordinates in a referential coordinate system.

10. The method of claim 1, wherein the target points are part of a processing line, along which the examination object is processed by the laser beam.

11. The method of claim 1, wherein the processing of the examination object by the laser beam comprises cutting the examination object.

12. The method of claim 1, wherein the tuples of coordinate values are ascertained in an examination device and are imported into a laser microdissection system used for processing the examination object by the laser beam.

13. A non-transitory computer-readable storage medium comprising instructions that, when executed, cause one or more processors to carry out a method according to claim 1.

14. A laser microdissection system, comprising:
a laser having a laser beam configured to process a microscopic examination object using tuples of coordinate values which respectively indicate positions of target points on the examination object at least in a first spatial direction and a second spatial direction orthogonal to the first spatial direction,
wherein the laser microdissection system is configured to:
ascertain beforehand positions of at least three reference points at least in each case in the first and second spatial directions and in a third spatial direction orthogonal to the first and second spatial directions, to
define a reference plane based on the positions of the reference points,
determine in each case for the target points further coordinate values indicating an expected position of the target points on the examination object in the third spatial direction as determined further coordinate values,
perform the determination of the further coordinate values depending on the reference plane defined by the position of the reference point(s), and
set a focal position of the laser beam for processing the examination object depending on the determined further coordinate values.

15. The laser microdissection system of claim 14, further comprising:
an autofocus system, which is settable to a preset value and is configured to carry out an autofocus routine based on features of the examination object,
wherein the preset value is predefinable depending on a position of the reference plane in the third spatial direction.

* * * * *